United States Patent [19]

von der Crone

[11] 4,400,507

[45] Aug. 23, 1983

[54] ISOINDOLINE PIGMENTS

[75] Inventor: Jost von der Crone, Riehen, Switzerland

[73] Assignee: Ciba-Geigy Corporation, Ardsley, N.Y.

[21] Appl. No.: 214,944

[22] Filed: Dec. 10, 1980

Related U.S. Application Data

[62] Division of Ser. No. 892,535, Apr. 3, 1978, Pat. No. 4,262,120.

[30] Foreign Application Priority Data

Apr. 7, 1977 [CH] Switzerland ............... 4431/77

[51] Int. Cl.³ .............................. C09B 57/04
[52] U.S. Cl. .................................. 544/300
[58] Field of Search .............. 544/284, 300; 260/326.1

[56] References Cited

U.S. PATENT DOCUMENTS 3,646,033  2/1972  Leister et al. ............ 544/284
3,923,806 12/1975  Bock et al. ............... 544/300
4,262,120  4/1981  von der Crone ......... 260/326.1

Primary Examiner—Paul M. Coughlan, Jr.
Attorney, Agent, or Firm—Harry Falber

[57] ABSTRACT

Isoindolinone pigments of the formula

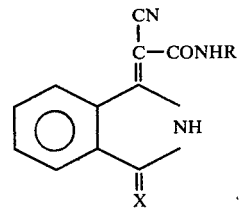

in which R is an aryl radical which can contain groups which do not confer solubility and X is a group of the formulae

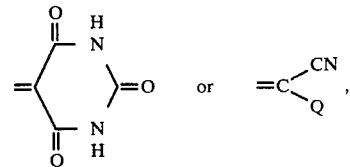

in which Q is a radical of the formula

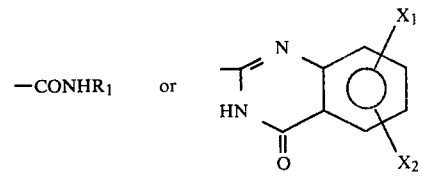

in which $R_1$ is a di- or tri-halogenophenyl radical or a carbamoylphenyl radical or a phenyl radical which is fused with a 5-membered or 6-membered hetero-ring which contains a cyclically bonded —CONH group, are useful for coloring in yellow to orange shades of good fastness properties.

5 Claims, No Drawings

ISOINDOLINE PIGMENTS

This is a Divisional of application Ser. No. 892,535, filed Apr. 3, 1978, now U.S. Pat. No. 4,262,120, issued Apr. 14, 1981.

The present invention relates to isoindoline pigments of the formula

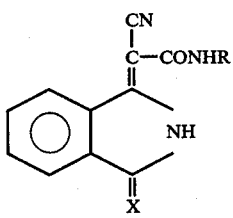

in which R is an aryl radical which can contain groups which do not confer solubility and X is a group of the formulae

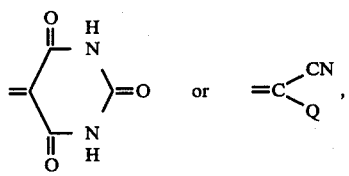

in which Q is a radical of the formula

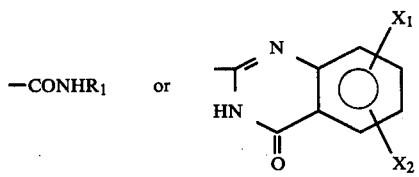

in which $R_1$ is a di- or tri-halogenophenyl, a carbamoylphenyl radical or a phenylcarbamoylphenyl radical which is unsubstituted or substituted by halogen atoms or methyl, trifluoromethyl, methoxy or acetylamino groups, or a phenylene radical which is fused with a 5-membered or 6-membered hetero-ring which contains a cyclically bonded —CONH group, and $X_1$ and $X_2$ are H or halogen atoms or alkyl or alkoxy groups having 1-4 C atoms, or in which $X_1$ and $X_2$ form a fused benzene ring.

Substituents which do not confer solubility are understood as meaning those which do not effect dissolution of the pigment either in water or in organic solvents, thus, for example, halogen atoms, alkyl or alkoxy groups having 1–6 C atoms, nitro, trifluoromethyl, carbamoyl, ureido, sulphamoyl or cyano groups, alkoxycarbonyl, alkanoyl, alkylcarbamoyl, alkylureido or alkanoylamino groups having 2–6 C atoms, alkylsulphonyl or alkylsulphamoyl groups having 1–6 C atoms or aryloxycarbonyl, aroyl, aroylamino, arylsulphonyl, arylcarbamoyl, arylsulphamoyl, aryl, arylureido or arylazo groups.

$R_1$ is preferably a radical of the formula

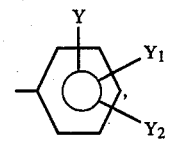

in which Y is a H or halogen atom, a methyl or carbamoyl group, an alkanoylamino group having 1–4 C atoms, a benzoylamino or phenylcarbamoyl group, which can be substituted in the phenyl radical by halogen atoms or methyl, methoxy, trifluoromethyl or acetylamino groups, or a phthalimide group which can be substituted in the phenylene radical by chlorine atoms, and $Y_1$ and $Y_2$ are H or halogen atoms or alkyl or alkoxy groups having 1–4 C atoms, or in which Y and $Y_1$ form a fused 5-membered to 6-membered hetero-ring which contains a cyclically bonded —CONH group.

Preferred pigments are those of the formula

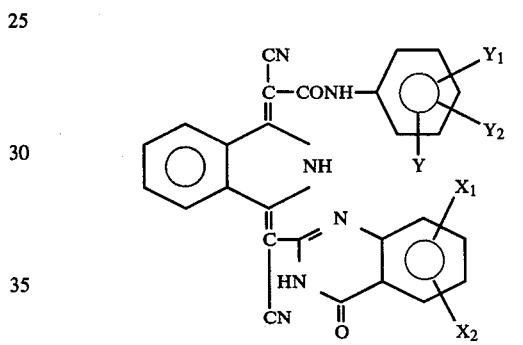

in which $X_1$, $X_2$, Y, $Y_1$ and $Y_2$ are as defined above.

Particularly preferred pigments are those of the formula

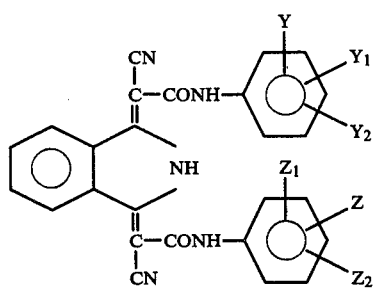

in which Y, $Y_1$ and $Y_2$ are as defined above, Z is a H, chlorine or bromine atom, a carbamoyl group or a phenylcarbamoyl group which is unsubstituted or substituted by chlorine atoms or methyl groups, and $Z_1$ and $Z_2$ are H, chlorine or bromine atoms, $Z_1$ and $Z_2$ being chlorine or bromine atoms when Z is H and $Z_1$ and/or $Z_2$ being chlorine or bromine when Z is halogen, or in which Z and $Z_1$ form a fused 5-membered to 6-membered hetero-ring which contains a cyclically bonded —CONH group, and especially those of the formula

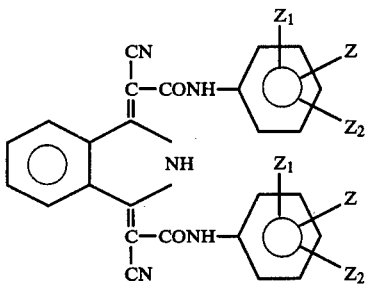

in which Z, $Z_1$ and $Z_2$ are as defined.

The pigments according to the invention are obtained by subjecting a diiminoisoindoline of the formula

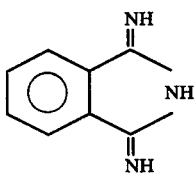

to a condensation reaction with, in any desired sequence, one mol of a cyanoacetanilide of the formula

and one mol of a compound of the formula $XH_2$, in which formulae R and X are as defined.

Examples of cyanoacetanilides are: cyanoacetic acid anilide, cyanoacetic acid 2'-, 3'- or 4'-chloroanilide, cyanoacetic acid 2',4'-dichloroanilide, cyanoacetic acid 2',5'-dichloroanilide, cyanoacetic acid 2',3'-dichloroanilide, cyanoacetic acid 3',4'-dichloroanilide, cyanoacetic acid 3',5'-dichloroanilide, cyanoacetic acid 2',4',5'-trichloroanilide, cyanoacetic acid 3',4',5'-trichloroanilide, cyanoacetic acid 4'-bromoanilide, cyanoacetic acid 3',4'-dibromoanilide, cyanoacetic acid 3'-chloro-4'-bromoanilide, cyanoacetic acid 3'-bromo-4'-chloroanilide, cyanoacetic acid 2'-, 3'- or 4'-methylanilide, cyanoacetic acid 2',4'-dimethylanilide, cyanoacetic acid 2',4',6'-trimethylanilide, cyanoacetic acid 2'-, 3'- or 4'-methoxyanilide, cyanoacetic acid 4'-acetylaminoanilide, cyanoacetic acid 4'-benzoylaminoanilide, cyanoacetic acid 4'-p-chloro-benzoylamino-anilide, cyanoacetic acid 4'-phthalimido-anilide, cyanoacetic acid 2',5'-dichloro-4'-benzoylaminoanilide, cyanoacetic acid 2',5'-dichloro-4'-p-chlorobenzoylamino-anilide, cyanoacetic acid 2',5'-dichloro-4'-methoxy-anilide, cyanoacetic acid 2',5'-dimethoxy-4'-benzoylamino-anilide, cyanoacetic acid 4'-nitroanilide, cyanoacetic acid 3'-chloro-4'-methyl-anilide, cyanoacetic acid 2'-, 3'- or 4'-methoxycarbonyl-anilide, cyanoacetic acid 3'-trifluoromethyl-anilide, cyanoacetic acid 2',5'-diethoxy-4'-benzoylamino-anilide, cyanoacetic acid 2',5'-dimethoxy-chloroanilide, cyanoacetic acid 4'-carbamoyl-anilide, cyanoacetic acid 3'-chloro-4'-carbamoyl-anilide, cyanoacetic acid 2'-methyl-4'-carbamoyl-anilide, cyanoacetic acid 2'-chloro-5'-carbamoyl-anilide, cyanoacetic acid 2'-methyl-5'-carbamoyl-anilide, cyanoacetic acid 2'-methoxy-5'-carbamoyl-anilide, cyanoacetic acid 2'-chloro-5'-phenylcarbamoyl-anilide, cyanoacetic acid 2'-methyl-5'-phenylcarbamoyl-anilide, cyanoacetic acid 2'-methoxy-5'-phenylcarbamoyl-anilide, cyanoacetic acid 2'-chloro-5'-p-methylcarbamoyl-anilide, cyanoacetic acid 2'-chloro-5'-p-chlorocarbamoyl-anilide, cyanoacetic acid 2'-methoxy-5'-p-chlorocarbamoyl-anilide, cyanoacetic acid 2'-methoxy-5'-m-trifluoromethylcarbamoyl-anilide and cyanoacetic acid 2'-methoxy-5'-2'',5''-dichlorocarbamoyl-anilide, and also the cyanoacetyl compounds of the following amines: 5-amino-benzimidazolone, 5-amino-1-methyl-benzimidazolone, 5-amino-6-chloro-benzimidazolone, 5-amino-6-methyl-benzimidazolone, 6-amino-quinazol-4-one, 6-amino-2-methyl-quinazol-4-one, 7-amino-quinazolone, 2-(4'-aminophenyl)-quinazol-4-one, 6-amino-2,4-dihydroxyquinazoline, 7-amino-phenmorphol-3-one, 6-amino-phenmorphol-3-one, 7-amino-6-methyl-phenmorphol-3-one, 6-amino-quinol-2-one, 7-amino-4-methyl-quinol-2-one, 6-amino-7-chloro-4-methyl-quinol-2-one and 7-amino-4,8-dimethyl-quinol-2-one.

The cyanoacetyl compounds are known compounds which are obtained by heating ethyl cyanoacetate with the corresponding amines.

The compounds of the formula $XH_2$ are, on the one hand, barbituric acid and, on the other hand, cyanomethylene compounds of the formula

in which Q is as defined.

Examples of cyanoacetanilides of the formula $CNCH_2CONHR_1$ are: cyanoacetic acid 2',3'-dichloroanilide, cyanoacetic acid 3',4'-dichloroanilide, cyanoacetic acid 3',5'-dichloroanilide, cyanoacetic acid 2',4'-dichloroanilide, cyanoacetic acid 3',4',5'-trichloroanilide, cyanoacetic acid 3',4'-dibromoanilide, cyanoacetic acid 4'-carbamoyl-anilide, cyanoacetic acid 3'-chloro-4'-carbamoyl-anilide, cyanoacetic acid 4'-phthalimido-anilide, cyanoacetic acid 3'-bromo-4'-chloroanilide, cyanoacetic acid 3'-chloro-4'-bromoanilide, cyanoacetic acid 2'-chloro-5'-carbamoyl-anilide, cyanoacetic acid 2'-methyl-5'-carbamoyl-anilide, cyanoacetic acid 2'-methoxy-5'-carbamoyl-anilide, cyanoacetic acid 2'-chloro-5'-phenylcarbamoyl-anilide, cyanoacetic acid 2'-methoxy-5'-phenylcarbamoyl-anilide, cyanoacetic acid 2'-methyl-5'-phenylcarbamoyl-anilide, cyanoacetic acid 2'-chloro-5'-p-chlorophenylcarbamoyl-anilide, cyanoacetic acid 2'-chloro-5'-p-methylphenylcarbamoyl-anilide and cyanoacetic acid 2'-methoxy-5-p-chloro-phenylcarbamoyl-anilide.

The compounds of the formula

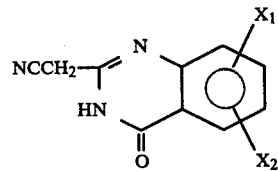

are also known and are obtained by a condensation reaction of ethyl cyanoacetate with anthranilic acid amides, for example anthranilamide, 2-amino-3-chlorobenzamide, 2-amino-4-chlorobenzamide, 2-amino-5-chloro-benzamide, 2-amino-5-methyl-benzamide, 2,3-aminonaphthoic acid amide, 2-amino-4,6-dichlorobenzamide or 2-amino-5-methoxy-benzamide.

The condensation reaction of diiminoisoindoline with the cyanoacetanilides and the compound of the formula $XH_2$ is preferably carried out in an organic solvent, for example an aliphatic alcohol having 1-4 C atoms, such as methanol, ethanol, isopropanol or butanol, and also glycols or glycol ethers, open-chain or cyclic amides, such as dimethylformamide, dimethylacetamide or N-methylpyrrolidone, a halogenated benzene, such as mono-, di- or tri-chlorobenzene, or nitrobenzene or an aliphatic mono- or di-carboxylic acid, such as formic acid, acetic acid, propionic acid, mono- or di-chloroacetic acid, fumaric acid, lactic acid or tartaric acid, or an aromatic carboxylic acid, such as benzoic acid, phthalic acid or salicylic acid, and it is also possible to use mixtures of the said solvents. In order to prepare asymmetric dicondensation products it can be advantageous if the monocondensation products are first prepared with the cyanoacetanilides. The reaction to give the monocondensation products is advantageously carried out in neutral organic solvents, for example an aliphatic alcohol having 1-4 C atoms, such as methanol, ethanol, isopropanol or butanol, and an excess of diiminoisoindoline is used. If necessary, these products can be isolated and purified. As a rule, the replacement of the first imino group of diiminoisoindoline already takes place at temperatures below 100° C. The replacement of the second imino group, on the other hand, requires temperatures of between 100° and 200°.

In most cases, the resulting pigments already precipitate in the hot mixture and can be isolated in a pure form by filtering off and, if necessary, by washing with ogranic solvents.

The resulting pigments in general have a good texture and in most cases can be used in the form of the crude products. If necessary or desirable, the crude products can be converted into a finely disperse form by grinding or kneading. In this case, grinding assistants, such as inorganic and/or organic salts, in the presence or absence of organic solvents, are advantageously used. An improvement in the properties can frequently also be achieved by treating the crude pigments with organic solvents. After grinding, assistants are removed in a conventional manner, soluble inorganic salts being removed, for example, with water and organic assistants which are insoluble in water being removed, for example, by steam distillation.

The pigments obtained according to the invention are suitable for colouring high-molecular organic material of natural or synthetic origin. The materials can be, for example, natural resins, drying oils or rubber. However, they can also be modified natural substances, for example chlorinated rubber, oil-modified alkyd resins or cellulose derivatives, such as viscose, acetylcellulose and nitrocellulose, and especially fully synthetic organic polyplasts, i.e. plastics which are prepared by polymerisation, polycondensation and polyaddition. Plastics of this category are, in particular, those which follow: polyethylene, polypropylene, polyisobutylene, polystyrene, polyvinyl chloride, polyvinyl acetate, polyacrylonitrile, polyacrylates and polymethacrylates; polyesters, especially high-molecular esters of aromatic polycarboxylic acids with polyfunctional alcohols; polyamides; the condensation products of formaldehyde with phenols, i.e. the so-called phenoplasts, and the condensation products of formaldehyde with urea, thiourea and melamine, i.e. the so-called aminoplasts; the polyesters used as lacquer resins, specifically both saturated resins, for example alkyd resins, and unsaturated resins, for example maleate resins, and also the polyaddition and polycondensation products of epichlorohydrin with diols or polyphenylene which are known by the name "epoxide resins"; and also the so-called thermoplastics, i.e. the non-curable polyplasts. It is emphasised that not only the single compounds but also mixtures of polyplasts and also co-condensates and copolymers, for example those based on butadiene, can be pigmented according to the invention.

The pigments according to the invention are suitable for colouring vinyl, polyolefin and styrene polymers, such as polyplasts, such as so-called film-forming agents or binders which are known as lacquer raw materials, especially linseed oil varnish, nitrocellulose, alkyd resins, melamine resins and urea-formaldehyde resins. Pigmenting of the high-molecular organic substances with the pigments is carried out, for example, by mixing a pigment of this type, if desired in the form of a master batch, into the substrates using roll mills or mixing or grinding apparatuses. The pigmented material is then brought into the desired final form by processes known per se, such as calendering, compression moulding, extrusion, spreading or casting or by injection moulding. Frequently it is desirable, in order to produce non-rigid mouldings or to reduce the brittleness thereof, to incorporate so-called plasticisers into the high-molecular compounds before shaping. Examples of plasticisers which can be used are esters of phosphoric acid, phthalic acid or sebacic acid. In the process according to the invention, the plasticisers can be worked into the polyplasts before or after the organic pigment is incorporated. It is also possible, in order to obtain different colour shades, also to add fillers or other colouring constituents, such as white pigments, coloured pigments or black pigments, in any desired amounts, in addition to the compounds of the formula (I), to the high-molecular organic material.

For pigmenting lacquers and printing inks, the high-molecular organic materials and the pigments, if desired together with additives such as fillers, other pigments, siccatives or plasticisers, are finely dispersed or dissolved in a common organic solvent or solvent mixture. The procedure employed can be that the individual components are dispersed or dissolved on their own or that several components are dispersed or dissolved together, and that all the components are combined only after this.

The pigmented high-molecular organic materials contain, in general, amounts of 0.001 to 30% by weight of pigment, based on the high-molecular organic material to be pigmented, and polyplasts and lacquers preferably contain 0.1 to 5% and printing inks preferably contain 10 to 30%. The amount of pigment which is to be chosen depends, in particular, on the desired depth of colour and also on the layer thickness of the moulding and finally, where appropriate, also on the white pigment content of the polyplast.

The pigmented high-molecular organic substances have very fast yellow to red colour shades and are distinguished by clarity of the colour shade, good fastness to light, weathering, migration, over-lacquering and solvents and stability to heat. The pigments also have such a good tinctorial strength that they still give deep colorations even after they have been converted into a covering form.

The examples which follow illustrate the invention. Temperatures are in degrees centigrade.

EXAMPLE 1

3.57 g of 1-(cyano-3',4'-dichlorophenylcarbamoylmethylene)-3-imino-isoindoline and 4.58 g of cyanoacetic acid 3',4'-dichloroanilide in 50 ml of glacial acetic acid are heated to the reflux temperature, with stirring. As soon as the reaction mixture becomes viscous due to the orange colorant which precipitates, it is diluted with 50 ml of dimethylformamide and refluxed for a further 2 hours. After cooling to 100°, the pigment formed is filtered off with suction, washed with methanol, acetone and water and dried at 100°. This gives 4.4 g of 1,3-di-(cyano-3',4'-dichlorophenylcarbamoylmethylene)-isoindoline, which, in this form, can be incorporated direct as a pigment in paints and plastics. The colorations obtained therewith are distinguished by a very clear reddish-tinged yellow colour shade with outstanding fastness properties, especially good fastness to solvents, light and weathering. The 1-(cyano-3',4'-dichlorophenylcarbamoylmethylene)-3-imino-isoindoline employed is obtained by a known method from diiminoisoindoline and cyanoacetic acid 3',4'-dichloroanilide by a condensation reaction, in a molar ratio of 2:1, in boiling methanol.

EXAMPLE 2

2.9 g of diiminoisoindoline and 11.45 g of cyanoacetic acid 3',4'-dichloroanilide in 100 ml of o-dichlorobenzene are warmed at 70° for 2 hours, during which time the yellow monocondensation product forms. 5 ml of acetic acid are now added and the reaction temperature is raised to 140°–150°. After 5 hours, the mixture is allowed to cool to 100° and the product is filtered off with suction, washed with methanol and water and dried. This gives 9.8 g of pigment, which has the same properties as the product described in Example 1.

Pigments having equally good fastness properties are obtained when, in this example, o-dichlorobenzene is replaced by nitrobenzene or trichlorobenzene and acetic acid is replaced by one of the following acids: propionic acid, chloroacetic acid, dichloroacetic acid, phthalic anhydride, salicylic acid, fumaric acid, lactic acid or tartaric acid.

A particularly good fastness to solvents is obtained when, in Example 2, acetic acid is replaced by formic acid.

EXAMPLE 3

As in Example 1, 12.9 g of 1-(cyano-4'-chlorophenylcarbamoyl-methylene)-3-imino-isoindoline and 18.3 g of cyanoacetic acid 3',4'-dichloroanilide are first heated in 200 ml of glacial acetic acid and the reaction mixture is then diluted with 200 ml of dimethylformamide. After cooling to 100°, filtering with suction and washing the product with methanol and water, 16.6 g of an orange pigment, which is suitable for colouring lacquers, are obtained. Colorations with good fastness to over-lacquering, light and weathering are obtained.

In Table I which follows, further pigments are described which are obtained when the compounds of the formula

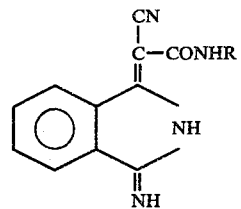

in which R is as described in column II, are subjected to a condensation reaction with cyanoacetic acid 3',4'-dichloro-anilide, in accordance with the instructions of Example 3.

TABLE I

| Example No. | R | Colour shade in lacquers |
| --- | --- | --- |
| 4 | phenyl | orange |
| 5 | 3,4-dichlorophenyl | reddish-tinged yellow |
| 6 | 4-carbamoylphenyl | orange |
| 7 | 3-chloro-4-carbamoylphenyl | orange |
| 8 | 4-methylphenyl | red |
| 9 | 3,4-dimethylphenyl | orange |
| 10 | 2,4,5-trichlorophenyl | yellow |
| 11 | 4-phthalimidophenyl | orange |
| 12 | 3-chloro-4-methylphenyl | orange |
| 13 | 2-methoxycarbonylphenyl | yellow |
| 14 | 2,5-dichloro-4-p-chloro-benzoylaminophenyl | reddish-tinged yellow |
| 15 | 2,5-diethoxy-4-benzoyl-aminophenyl | brown |
| 16 | 4-methoxy-2-nitrophenyl | orange |

EXAMPLE 17

3.2 g of 1-(cyano-4'-chlorophenylcarbamoyl-methylene)-3-imino-isoindoline and 4.58 g of cyanoacetic acid 3',4'-dichloroanilide in 50 ml of nitrobenzene are heated at 180° for 2 hours, with stirring. The orange colorant which has precipitated is filtered off with suction at 100°, washed with methanol, acetone and water and dried. This gives 3.2 g of pigment, which is brought into a state of fine division by grinding in isopropanol with the aid of grinding bodies. Orange colorations of high fastness are obtained with this pigment when it is incorporated in lacquers.

EXAMPLE 18

1.45 g of diiminoisoindoline, 3.43 g of cyanoacetic acid 3',4'-dichloroanilide and 0.97 g of cyanoacetic acid 4'-chloroanilide in 50 ml of o-dichlorobenzene are heated to 100°. 5 ml of formic acid are now added dropwise and the mixture is then warmed to 150°. After 4 hours, it is allowed to cool to 100° and the pigment is filtered off with suction, washed with alcohol, acetone and water and dried. This gives 3.7 g of a pigment powder having outstanding fastness to solvents. The crude product is suitable direct for colouring lacquers and yellow-orange colorations of high fastness are obtained.

EXAMPLE 19

2.88 g of 1-(cyano-phenylcarbamoyl-methylene)-3-iminoisoindoline and 1.28 g of barbituric acid in 50 ml of glacial acetic acid are refluxed, with stirring. The red-coloured reaction product forms as a thick precipitate. The reaction mixture is diluted with 50 ml of dimethylformamide and heated at 120°–130° for a further 10 minutes. The insoluble colorant is filtered off with suction at 100°, washed with methanol and water and dried at 100°. This gives 3.6 g of pigment, which can be employed direct for colouring paints. When it is incorporated in lacquers, the pigment is distinguished by a clear orange colour shade, good stability to light and weathering and also high fastness to over-lacquering.

In Table II which follows, further pigments are described which are obtained when the compounds of the formula

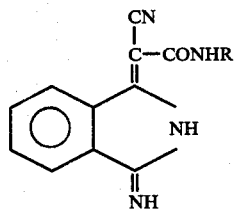

in which R is as defined in column II, are subjected to a condensation reaction with barbituric acid, in accordance with the instructions of Example 19.

The pigments are distinguished by good fastness properties.

TABLE II

| Example No. | R | Colour shade in lacquers |
| --- | --- | --- |
| 20 | 4-chlorophenyl | red |
| 21 | 4-methylphenyl | red |
| 22 | 2,4-dichlorophenyl | red |
| 23 | 2,5-dichlorophenyl | yellow |
| 24 | 3,5-dimethylphenyl | orange |
| 25 | 3,5-dichlorophenyl | yellow |
| 26 | 3,4-dimethylphenyl | red |
| 27 | 2-chlorophenyl | orange |
| 28 | 4-carbamoylphenyl | orange |
| 29 | 4-phthalimidophenyl | brown |
| 30 | 4-bromophenyl | orange |
| 31 | 4-benzoylaminophenyl | brown |
| 32 | 3-chlorophenyl | orange |
| 33 | 4-acetylaminophenyl | brown |
| 34 | 2-methoxycarbonylphenyl | yellow |
| 35 | 4-methyl-2-nitrophenyl | reddish-tinged yellow |
| 36 | 2-methyl-5-carbamoylphenyl | reddish-tinged yellow |
| 37 | 2-chloro-5-carbamoylphenyl | yellow |
| 38 | 4-nitrophenyl | yellow |
| 39 | 3-chloro-4-carbamoylphenyl | orange |
| 40 | 4-p-chlorophenylcarbamoylphenyl | orange |
| 41 | 2-methyl-5-p-chlorophenyl-carbamoylphenyl | yellow |
| 42 | 2-ethoxycarbonylphenyl | yellow |
| 43 | 2-chloro-5-p-chlorophenyl-carbamoylphenyl | yellow |
| 44 | 2-methoxy-5-p-chlorophenyl-carbamoylphenyl | orange |
| 45 | 2-chloro-5-p-methoxyphenyl-carbamoylphenyl | yellow |
| 46 | 2-chloro-5-p-acetylaminophenyl-carbamoylphenyl | yellow |
| 47 | 2-methoxy-5-2',5'-dichlorophenyl-carbamoylphenyl | red-brown |
| 48 | 2-chloro-5-2'-methoxyphenyl-carbamoylphenyl | yellow |
| 49 | 2-carbamoylphenyl | yellow |
| 50 | 2-methyl-5-2',5'-dichlorophenyl-carbamoylphenyl | orange |
| 51 | 2-methylphenyl | orange |
| 52 | 2-methoxyphenyl | brown |

EXAMPLE 53

2.88 g of 1-(cyano-phenylcarbamoyl-methylene)-3-iminoisoindoline and 3.7 g of 2-cyanomethyl-quinazolone in 50 ml of glacial acetic acid are refluxed for 10 minutes, with stirring. The sparingly soluble orange colorant formed is filtered off hot, with suction, washed with methanol, acetone and water and dried. This gives 4.0 g of the pure bis-methine-isoindoline pigment, which, when incorporated in PVC films, gives clear orange colorations with a good fastness to migration and light.

In Table III which follows, further pigments are described which are obtained when the compounds of the formula

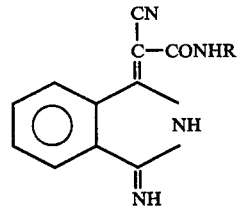

in which R is as defined in column II, are subjected to a condensation reaction with cyanomethyl compounds of the formula NCCH$_2$-R$_3$, in which R$_3$ is as defined in column III, in accordance with the instructions of Example 53. The pigments are distinguished by clarity and good fastness.

TABLE III

| Example No. | R | R$_3$ | Colour shade in PVC films |
| --- | --- | --- | --- |
| 54 | 4-methylphenyl | 2-quinazolyl | orange |
| 55 | 4-phthalimido-phenyl | 2-quinazolyl | bluish-tinged red |
| 56 | 4-carbamoylphenyl | 2-quinazolyl | red |
| 57 | 4-methylphenyl | 7-chloro-2-quinazolyl | bluish-tinged red |
| 58 | 4-methylphenyl | 6-chloro-2-quinazolyl | scarlet |
| 59 | phenyl | 6-chloro-2-quinazolyl | orange |

In Table IV which follows, further pigments are listed which are obtained when compounds of the formula

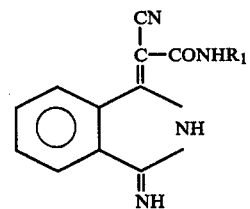

are subjected to a condensation reaction with cyanoacetic acid anilides of the formula NCCH$_2$CONHR$_1$, in which R$_1$ is as defined in colunm II, in accordance with the instructions of Example 1. The resulting pigments are distinguished by good fastness properties.

TABLE IV

| Example No. | R$_1$ | Colour shade in lacquers |
| --- | --- | --- |
| 60 | 3,5-dichlorophenyl | reddish-tinged yellow |
| 61 | 3,4-dibromophenyl | reddish-tinged yellow |
| 62 | 3,4,5-trichlorophenyl | yellow |
| 63 | 4-carbamoylphenyl | orange |
| 64 | 3-chloro-4-carbamoylphenyl | orange |
| 65 | 4-phthalimidophenyl | reddish-tinged yellow |

In Table V which follows, further pigments are listed which are obtained when compounds of the formula

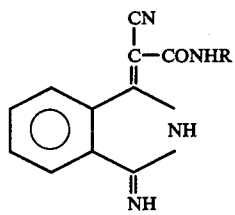

are subjected to a condensation reaction with cyanoacetic acid anilides of the formula $NCCH_2CONHR_1$, in which formulae R and $R_1$ are as defined in column II and III, in accordance with the instructions of Example 3. The resulting pigments are distinguished by good fastness properties.

TABLE V

| Example No. | R | $R_1$ | Colour shade in lacquers |
|---|---|---|---|
| 66 | phenyl | 4-carbamoylphenyl | yellow |
| 67 | 4-chlorophenyl | 3-chloro-4-carbamoylphenyl | yellow |
| 68 | 4-chlorophenyl | 3-chloro-4-carbamoylphenyl | orange |
| 69 | phenyl | 5-benzimidazolonyl | brown |
| 70 | 4-chlorophenyl | 7-quinazolyl | orange |
| 71 | 4-chlorophenyl | 2-chloro-5-phenylcarbamoylphenyl | yellow |
| 72 | 4-chlorophenyl | 2-chloro-5-carbamoylphenyl | reddish-tinged yellow |
| 73 | 4-chlorophenyl | 2-methyl-5-carbamoylphenyl | yellow |
| 74 | 4-chlorophenyl | 2-methoxy-5-phenylcarbamoylphenyl | orange |
| 75 | phenyl | 2-chloro-5-carbamoylphenyl | orange |
| 76 | 4-chlorophenyl | 3-chloro-4-p-chlorophenylcarbamoylphenyl | orange |
| 77 | 4-chlorophenyl | 2-chloro-5-p-chlorophenylcarbamoylphenyl | reddish-tinged yellow |
| 78 | 4-chlorophenyl | 2-methyl-5-m-chlorophenylcarbamoylphenyl | orange |
| 79 | 4-chlorophenyl | 2-methoxy-5-p-chlorophenylcarbamoylphenyl | orange |
| 80 | 4-chlorophenyl | 2-methoxy-5-2',5'-dichlorophenylcarbamoylphenyl | orange |
| 81 | 4-chlorophenyl | 2-chloro-5-p-methylphenylcarbamoylphenyl | yellow |
| 82 | phenyl | 2-chloro-5-p-chlorophenylcarbamoylphenyl | yellow |
| 83 | 4-methoxycarbonylphenyl | 2-chloro-5-carbamoylphenyl | yellow |
| 84 | phenyl | 2-methoxy-5-phenylcarbamoylphenyl | yellow |
| 85 | 3,4-dichlorophenyl | 4-chloro-2,5-dimethoxyphenyl | brown |

EXAMPLE 86

0.6 g of the pigment prepared according to Example 1 is mixed together with 67 g of polyvinyl chloride, 33 g of dioctyl phthalate, 2 g of dibutyl-tin dilaurate and 2 g of titanium dioxide and the mixture is processed on a roll mill for 15 minutes at 160° C. to give a thin film. The reddish-tinged yellow coloration produced in this way is deep and fast to migration, heat and light.

EXAMPLE 87

1.00 g of the pigment prepared according to Example 19 is finely ground with 4.00 g of printing varnish having the composition: 29.4% of linseed oil-stand oil (300 poise), 67.2% of linseed oil-stand oil (20 poise), 2.1% of cobalt octoate (8% of Co) and 1.3% of lead octoate (24% of Pb), on an Engelsmann grinding machine and then printed, with the aid of a block, by the letterpress process, in an amount of 1 g/m² on art paper. Deep, orange prints of good transparency and good gloss and good fastness to light are obtained.

The pigment is also suitable for other printing processes, such as gravure printing, offset printing and flexographic printing, and in these cases also gives very good results.

EXAMPLE 88

1 g of the pigment according to Example 3 and 5 g of titanium dioxide are added to 100 g of a stoving lacquer which consists of 58.5 g of a 60% strength solution of a coconut alkyd resin in xylene, 23 g of a 65% strength solution of a melamine lacquer resin in butanol, 17 g of xylene and 1.5 g of butanol. The mixture is ground for 48 hours in a ball mill and the lacquer pigmented in this way is sprayed onto a cleaned metal surface. After stoving at 120°, an orange coloration is obtained which has a good depth of colour and fastness to light, overlacquering and weathering.

What is claimed is:

1. An isoindoline pigment of the formula

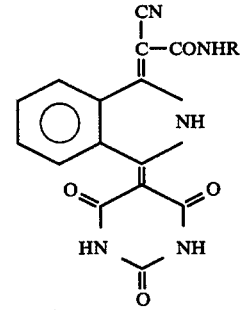

wherein R is phenyl mono- or di-substituted by chlorine, bromine, methyl, methoxy, nitro, methoxycarbonyl, ethoxycarbonyl, methoxyphenylcarbamoyl, acetylaminophenylcarbamoyl or phthalimido; with the proviso that phenyl is mono-substituted when only chlorine or bromine is substituted thereon.

2. The pigment of claim 1, wherein R is 4-chlorophenyl.

3. the pigment of claim 1, wherein R is 2-methoxycarbonylphenyl.

4. The pigment of claim 1, wherein R is 2-ethoxycarbonylphenyl.

5. The pigment of claim 1, wherein R is 2-methylphenyl.

* * * * *